United States Patent [19]

Pass

[11] 3,882,760
[45] May 13, 1975

[54] VALVE ACTUATORS

[76] Inventor: Roger D. Pass, 1119 W. Montana Ave., St. Paul, Minn. 55108

[22] Filed: Aug. 24, 1973

[21] Appl. No.: 391,502

[52] U.S. Cl. .................. 91/422; 92/110; 137/231
[51] Int. Cl. ........................................ F15b 11/08
[58] Field of Search ............ 137/231; 251/63.4, 62; 92/110; 91/422

[56] References Cited
UNITED STATES PATENTS

| | | | |
|---|---|---|---|
| 712,461 | 10/1902 | Rumboski | 137/231 |
| 838,219 | 12/1906 | Stanley | 137/231 |
| 1,245,115 | 10/1917 | McEwen | 137/231 |
| 1,301,508 | 4/1919 | Schroder | 132/231 |
| 2,027,956 | 1/1936 | Bouser | 137/231 |
| 2,896,413 | 7/1959 | Hussey | 92/110 X |
| 3,473,328 | 10/1969 | Mayhew | 92/110 X |
| 3,704,855 | 12/1972 | Combes | 251/63.4 |

FOREIGN PATENTS OR APPLICATIONS

| | | | |
|---|---|---|---|
| 985,569 | 2/1951 | France | 137/231 |

*Primary Examiner*—Harold W. Weakley

[57] ABSTRACT

A valve actuator, operated by an interruptible fluid pressure source, such as an air hand pump, capable of opening during the flow period a spring biased valve, such as a tire valve, while simultaneously passing a fluid under pressure to an object to be pressurized and capable of allowing the spring biased valve to close under its own bias during the non-flow period, is described employing a reciprocating piston and piston rod operated by differential pressure.

2 Claims, 8 Drawing Figures

PATENTED MAY 13 1975 3,882,760

VALVE ACTUATORS

BACKGROUND OF THE INVENTION

1. Field of the Invention

Class 251, subclass 20. Valves and valve actuation, Fluid actuated or retarded, Compulsory cut-off after flow period, Forced return of actuator to cut-off position.

2. Description of the Prior Art

In a conventional valve actuator a spring biased valve, such as a tire valve, is opened mechanically as the valve actuator is in the process of being coupled to the tire valve. During the interval that the valve actuator is in partial attachment to the tire valve, fluid under pressure can escape to the outside atmosphere from the object that has been pressurized.

SUMMARY OF THE INVENTION

It is an object of this invention to provide a valve actuator operated by an interruptible fluid pressure source, such as an air hand pump, capable of attachment to a tire valve, capable of depressing and thereby opening during the flow period from the fluid pressure source the spring biased valve of the tire valve while simultaneously passing a fluid under pressure to an object to be pressurized and capable of allowing the spring biased valve to close under its own bias during the non-flow period while the valve actuator is in complete attachment to the tire valve so as to minimize the loss of pressure from the pressurized object as the valve actuator is uncoupled from the tire valve.

It is a further object of this invention to provide a mechanical advantage in the depressing and opening of the spring biased valve so that the air pressure necessary to operate the valve actuator is minimal and may be readily and easily generated by an air hand pump.

These objectives are accomplished by a valve actuator consisting of a casing having inlet and outlet connector means, a piston and piston rod reciprocally contained therein, and a vent in its upper portion. Air entering the inlet exerts pressure upon the lower end of the piston. As the upper end of the piston is under atmospheric pressure, the piston and piston rod will slide forward whereupon the piston rod, which is partially penetrating the outlet opening of the outlet connector means, which in turn is attached to a tire valve, will depress and open the spring biased valve of the tire valve. Air is now free to flow from the pump to the object to be pressurized via a flow passage located in the piston and piston rod. When the air pressure from the pump is interrupted, the spring biased valve core stem of the tire valve will push the piston rod and piston back down into the casing and the spring biased valve will close by itself.

DESCRIPTION OF THE PREFERRED EMBODIMENTS

Figure 1:
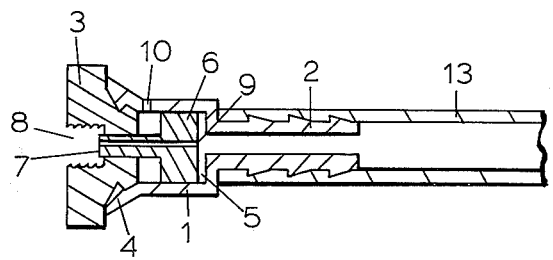
FIG. 1 is a cross sectional view of a valve actuator.

FIG. 1 illustrates a valve actuator embodying a casing 1 incorporating at opposing ends inlet and outlet connector means being, respectively, a multiply ribbed lower body section 2 and a thumb nut 3 secured and rotatable within the flanged upper body section 4. Provided within said casing is a cylindrical chamber 5 wherein a piston 6 is reciprocally contained and is capable of moving or sliding back and forth in relationship to said opposing ends. Extending forward from and in contiguous relationship to said piston 6 is the piston rod 7 which extends to and is capable of extending partially through the outlet opening 8 in said rotatable thumb nut 3. A flow passage 9 extends through both said piston and said piston rod. The upper portion of said cylindrical chamber is vented to the outside atmosphere by the vent 10.

Figure 2:
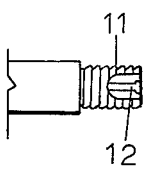
FIG. 2 is a partial cut away view of a spring biased tire valve.

FIG. 2 illustrates a partial view of a standard spring biased valve, such as a tire valve used on American automobile and bicycle tires, showing the threaded stem end 11 and the spring biased valve core stem 12.

To operate the valve actuator, said threaded stem end 11 is screwed within the threaded portion of said outlet opening 8. Fluid entering the hose 13 from a fluid pressure source, such as an air hand pump, not shown, passes through the inlet passage located within said multiply ribbed lower body section and into the lower portion of said cylindrical chamber where the air exerts pressure upon the lower end of said piston 6. As the upper portion of said cylindrical chamber is vented to the outside atmosphere by the vent 10, the air pressure will be greater in the lower portion of said cylindrical chamber than in the upper portion of said cylindrical chamber causing said piston and said piston rod to be forced forward at which time the upper end portion of said piston rod 7 will penetrate into said threaded stem end 11 depressing said spring biased valve core stem 12 thereby opening said spring biased valve. The air is now free to flow through said flow passage 9, through the now open spring biased valve and into the object to be pump up or pressurized. When the air pressure from the air source is interrupted, the spring biased valve core stem 12 will push said piston rod and said piston back down into said cylindrical chamber and said spring biased valve will close by itself. As the rotatable thumb nut 3 is removed from said threaded stem end 11 no air will escape from the pressurized object as said spring biased valve will have assumed a closed position.

For maximum air transmittal from the air source to the object to be pressurized an air tight seal should be maintained between the outer circumferences of said piston and piston rod and the inner circumferences of said cylindrical chamber and the lower portion of said outlet opening 8, respectively.

FIG. 1 illustrates said air tight seal as simply a close tolerance fit between said circumferences that is maintained along the length of travel of said piston and said piston rod. FIG. 1 also has the additional advantage in the said piston 6 in its forward limit of travel can seal off the vent 10. This would effectively eliminate any unwanted leakage of air from the flow passage 9 to the outside atmosphere via the vent 10.

Figure 3:
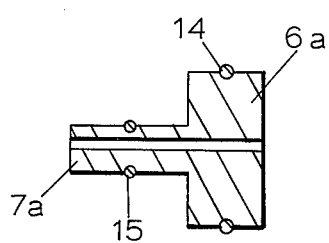
FIG. 3 is an enlarged sectional view of a piston and piston rod.

FIG. 3 illustrates an alternate means for achieving said air tight seal by the use of "O" rings 14 and 15 encircling the piston 6a and the piston rod 7a, respectively.

Figure 4:
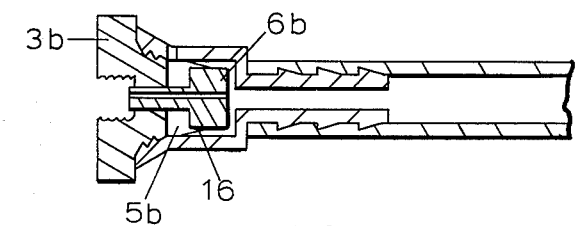
FIG. 4 is an alternate cross sectional view of a valve actuator.

FIG. 4 illustrates another alternate means for achieving said air tight seal by attaching a diaphram-like membrane 16 onto the piston 6b and the inner circumference of the cylindrical chamber 5b. The diaphram could also be attached to the piston 6b and to the rotatable thumb nut 3b, in which case, the cylindrical chamber 5b would be vented to the outside atmosphere by a vent located in the rotatable thumb nut 3b, similar to the vent 10c in FIG. 5.

Figure 5:
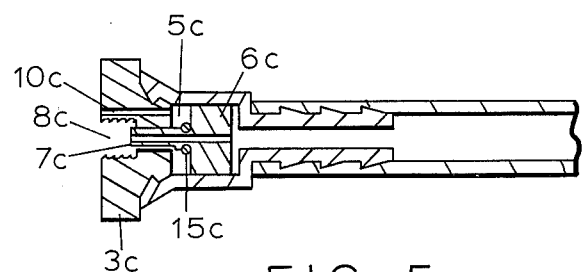
FIG. 5 is an alternate cross sectional view of a valve actuator.

FIG. 5 illustrates a slightly alternate version of FIG. 1. The upper portion of the piston rod 7c, along at least part of its circumference, is of a substantially smaller diameter than the diameter of the outlet opening 8c. The lower portion of the piston rod 7c is of a size in diameter to provide a close tolerance fit and thus an air tight seal between the outer circumference of said piston rod 7c and the inner circumference of said outlet opening 8c only when said piston rod 7c is at its forward limit of travel. This will allow the piston and piston rod 6c and 7c, respectively, to reciprocate faster and easier than the previously described versions of valve actuators. An O ring 15c is shown encircling the base of the piston rod 7c to assure a more reliable air tight seal by butting against the inner edge of said outlet opening 8c. The cylindrical chamber 5c is vented to the outside atmosphere by the vent 10c running through the rotatable thumb nut 3c.

Figure 6:
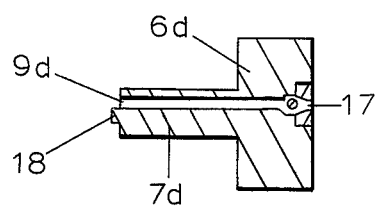
FIG. 6 is an enlarged sectional view of a piston and piston rod.

For even greater positive action of the piston and piston rod, a one way ball check valve 17 allowing the fluid to flow in a forward direction only, can be mounted within the flow passage 9d of the piston 6d and piston rod 7d as illustrated in FIG. 6 thereby eliminating the necessity for the ball check valve as now located in conjunction with an air hand pump. FIG. 6 also shows a knob 18 positioned at the forward end of the piston rod 7d to prevent a valve core stem, such as the spring biased valve core stem 12, from obstructing the flow passage 9d.

Figure 7:
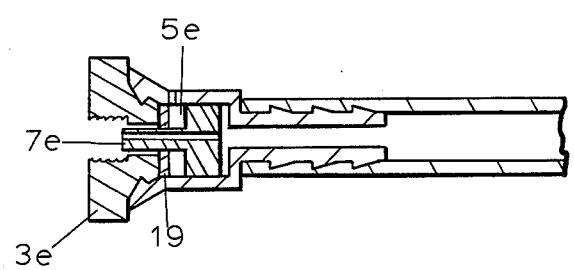
FIG. 7 is an alternate cross sectional view of a valve actuator.

FIG. 7 illustrates an alternate version of FIG. 1 wherein an air tight seal is maintained between the outer circumference of the piston rod 7e and the inner circumference of a sealing washer 19 and between the outer circumference of the sealing washer 19 and the inner circumference of the upper portion of the cylindrical chamber 5e. This will allow the thumb nut 3e to be rotatable independently of said piston rod 7e.

Figure 8:
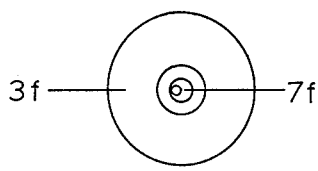
FIG. 8 is a front view of a valve actuator.

FIG. 8 is a typical front view of the valve actuators illustrated in FIGS. 1, 4, 5 and 7 showing a rotatable thumb nut 3f and a piston rod 7f.

It is not an object of this invention to provide a novel method of achieving an air tight seal as the art is replete with various methods. A few were shown and described to indicate some of the possibilities.

I claim:

1. A valve actuator consisting of a casing having inlet and outlet connector means, a cylindrical chamber provided within said casing and vented to the outside atmosphere by a vent, a piston movably contained within said cylindrical chamber, a piston rod extending from one end of said piston and a flow passage extending through said piston and said piston rod, wherein said outlet connector means is capable of attachment to a tire valve, said piston and said piston rod are reciprocally operable by differential pressure, said piston rod is capable of extending through the outlet opening of said outlet connector means and is capable of depressing the spring biased valve core stem of a tire valve when the tire valve is in attachment to said outlet connector means, and said piston rod along at least part of its length is of a substantially smaller diameter than the diameter of said outlet opening of said outlet connector means, the lower portion of said piston rod having sealing means to provide an air tight seal between the lower outer circumferential portion of said piston rod and the inner circumference of said outlet opening only when said piston rod is at its forward limit of travel.

2. A valve actuator in accordance with claim 1 wherein said flow passage is provided with a one way ball check valve.

* * * * *